Dec. 6, 1966 R. M. NEWCOMER 3,290,427
DEEP SEA HIGH PRESSURE CABLE ENTRY
Filed Feb. 26, 1965
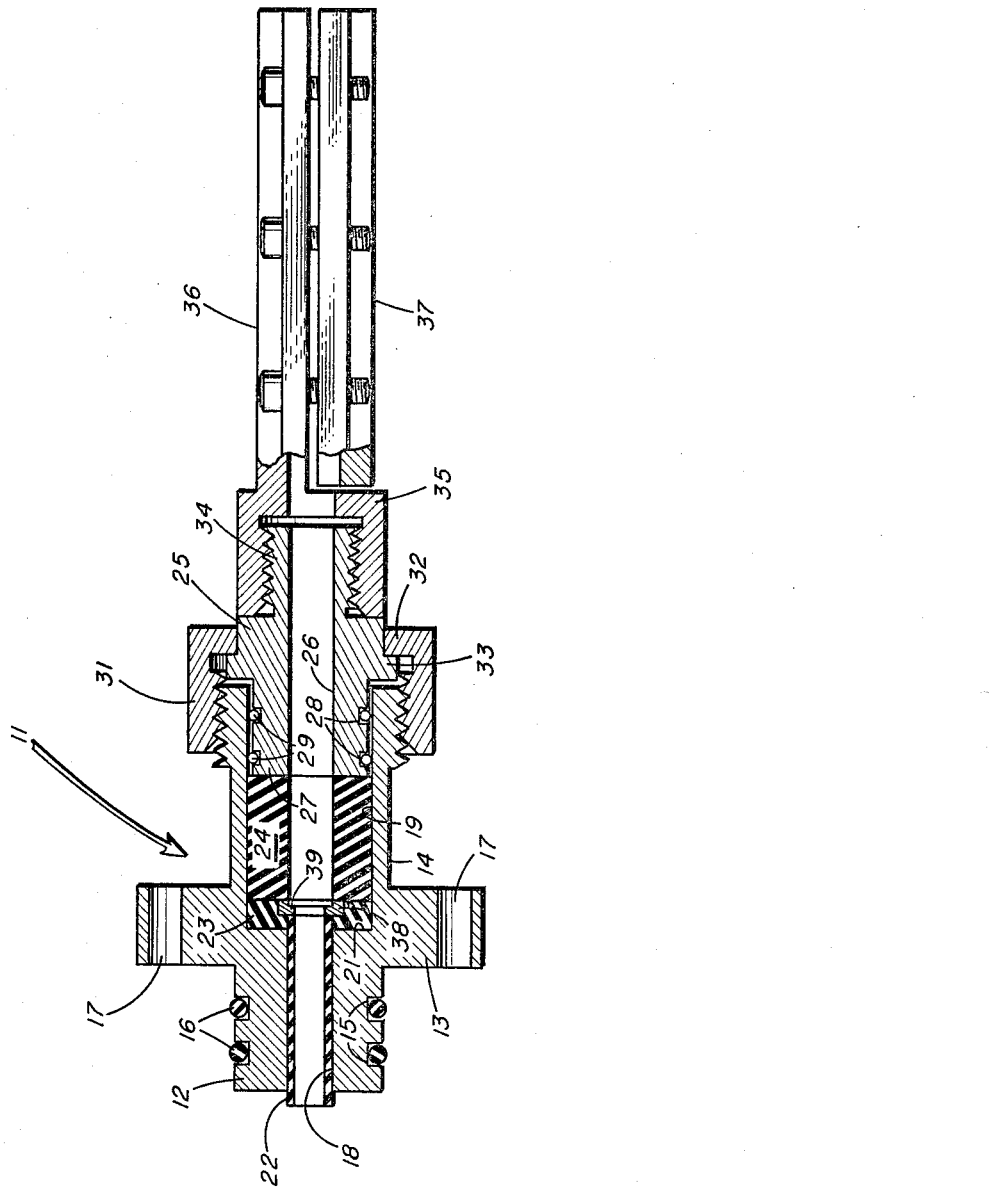
Ralph M. Newcomer
INVENTOR.
BY
ATTORNEY.
AGENT.

United States Patent Office 3,290,427
Patented Dec. 6, 1966

3,290,427
DEEP SEA HIGH PRESSURE CABLE ENTRY
Ralph M. Newcomer, Gaithersburg, Md., assignor to the United States of America as represented by the Secretary of the Navy
Filed Feb. 26, 1965, Ser. No. 435,759
11 Claims. (Cl. 174—65)

The invention described herein may be manufactured and used by or for the Government of the United States of America for governmental purposes without the payment of any royalties thereon or therefor.

The present invention relates generally to improvements in terminal couplers for electrical cables and more particularly to a new and improved cable entry device for introducing an electrical cable into a submersible instrument housing for deep sea research wherein the cable entry device is capable of withstanding extreme pressure differentials and temperature variations and is so constructed as to be easily disassembled and reassembled.

In the field of deep sea research and in certain military weapons intended for use at deep depths, much difficulty has been encountered in the development of a terminal coupler for an electrical cable to introduce the cable through the wall of an instrument housing without permitting leakage of water or vapor into the interior of the housing. Various attempts have heretofore been made to sealingly introduce an electrical cable to the interior of the instrument housing but these attempts have not been entirely satisfactory when the coupling is exposed to extreme temperature variations or is used at extreme hydrostatic pressures. In those couplers where the cable was either taped or cemented to produce a seal, the seal has been found to deteriorate by chemical action when exposed to seawater and is also adversely affected when exposed to extreme temperature variations or mechanical impacts and abrasions occasioned during handling. Although molded cable couplers resist leakage at high hydrostatic pressures, the molded seal cannot be readily disassembled and reassembled in the field to make repairs to the cable or to the instrument within the housing. Previously known mechanical seals have not performed satisfactorily at high hydrostatic pressures because the sealing forces exerted by either mechanical means or by hydrostatic pressures were so great as to compress the cable to the extent that the jacket of the cable was either extruded or severed to cut into the conductors and thereby interrupt the electrical continuity of the cable. The terminal coupler of the present invention overcomes the shortcomings of the previously known devices and produces a vapor tight seal at pressures in excess of 10,000 p.s.i. and is adapted to be readily disassembled and reassembled.

An object of the present invention is the provision of a fluid impervious seal and a vapor impervious seal around an electrical cable as it passes through a wall across which an extreme pressure differential may exist.

Another object of the invention is the provision of a terminal coupler for introducing an electrical cable to the interior of an instrument housing which is to be subjected to substantial variations in pressure and temperature.

A further object of the invention is to provide an electrical cable terminal coupler which is adapted to be readily disassembled and reassembled and which will produce a fluid impervious and vapor impervious seal for the introduction of an electrical cable to the interior of an instrument housing throughout a large range of temperatures and hydrostatic pressures.

Other objects and advantages of this invention will become apparent to those skilled in the art as the disclosure is made in the following description of a preferred embodiment of the invention as illustrated in the accompanying sheet of drawing in which the figure is a vertical sectional view of the cable entry device in its assembled condition.

The cable entry device of this invention, as seen in the drawing, has an elongated cylindrical body member shown generally at 11, said body member having a neck portion 12, an annular flange 13, and a packing housing 14. The neck portion of the body member is provided with a pair of annular grooves 15 formed in the outer peripheral surface to receive a pair of O-rings 16 for sealing engagement with the wall of an instrument housing when the neck portion is inserted into a through aperture formed in one wall of said instrument housing. The annular flange 13 formed on the body member has a plurality of through apertures 17 formed therein and positioned circumferentially therearound to receive threaded bolts for mounting of the body member upon the instrument housing. The body member of the cable entry device is provided with an axial bore 18 formed therethrough and is further provided with a second bore or counter bore 19 to define an annular shoulder 21 at the junction of the axial bore and the counter bore. Received within the axial bore 18 in the neck portion 12 is a cylindrical sleeve 22 of dielectric material having an enlarged annular flange portion 23 formed integrally therewith at one end, the outer diameter of the sleeve 22 and annular flange 23 being substantially equal to the inner diameters of the axial bore and the counter bore respectively. Positioned within the counter bore 19 is a packing grommet or sleeve-like bushing 24 formed of an elastic, substantially incompressible material which is deformable under pressure, such as natural rubbers in elastic form, or any of the synthetic rubbers or synthetic elastic compounds having the physical characteristics of live elastic natural rubber, such as neoprene. The annular packing grommet or bushing has an outer diameter substantially equal to the diameter of the counter bore and has an inner diameter substantially equal to the outer diameter of the electrical cable which is to be positioned within the cable entry device and introduced to the interior of the instrument housing.

To compress the packing 24 for sealing engagement with the electrical cable passing through the bore formed in the packing, the device is provided with a packing retainer 25 which has an axial bore formed therethrough, the diameter of the bore 26 being substantially equal to the outer diameter of the electrical cable. The retainer is provided with a cylindrical piston portion 27 which is slideably received within the counter bore 19 formed in the body member 11. The piston portion of the retainer is provided with a pair of annular grooves 28 formed in the outer peripheral surface thereof to receive a pair of O-rings 29 which are adapted to slideably sealingly engage the inner peripheral surface of the counter bore 19 when the piston portion 27 of the retainer 25 is inserted within the counter bore 19. The end of the packing housing adjacent the retainer is provided with screw threads formed on the outer peripheral surface thereof for engagement with a threaded nut 31, the nut being provided with an annular flange 32 portion which extends radially inwardly for abutting contact with an outwardly extending annular flange 33 formed upon the retainer 25. By virtue of the interlocking connection of the annular flanges 32 and 33 formed upon the nut 31 and retainer respectively and the threaded engagement of the nut with the packing housing, threading of the nut upon the packing housing will cause the piston portion 27 of the retainer 25 to be forced into the counter bore 19 to compress the packing 24. It is noted that the sum of the lengths of the piston portion 27 on the retainer 25 and the packing grommet 24 and the annular flange 23 on the dielectric sleeve is slightly greater than the length of the counter bore 19 formed in the packing housing section of the body member 11. As seen in the figure of the drawing, the aforementioned parts are assembled but are not in their stressed position, i.e., the packing member 24 is abutted on opposite ends by the annular flange 23 and the piston portion of the retainer but is not compressed thereby. In this position, the forward edge of the annular flange 33 formed by the retainer body is spaced apart a short distance from the end surface of the packing housing 14. When the nut 31 is further threaded upon the packing housing 14, the piston portion 27 of the retainer is forced into the counter bore 19 of the packing housing an additional distance to compress the packing 24 until the annular flange 33 of the retainer 25 engages the end of the packing housing and acts as a stop means to limit the movement of the piston and the compression of the packing 24. This structural arrangement permits the packing to be compressed a sufficient amount to form a water tight and vapor proof seal around the electrical cable but limits the maximum compressive force applied to the packing 24 regardless of the magnitude of the torque applied to the nut 31, thus positively preventing the possible deformation of the packing 24 to the extent where its radial compression severs or otherwise damages electrical cable.

To secure the electrical cable to the cable entry device and to prevent relative longitudinal movement therebetween, the retainer 25 is provided with an externally threaded stud portion 34 on the outer end thereof for coupling engagement with an internally threaded strain relief clamp 35. The enlarged base portion of the strain relief clamp is provided with internal threads for engagement with the threaded stud 34 and is provided with a pair of elongated arcuate clamping elements 36 and 37. The clamping element 36 is formed integrally with the base portion of the strain relief clamp while the cooperating clamping portion 37 is removably secured to the clamping section 36 by any conventional means, not shown, such as a plurality of bolts or screws which draw the clamping segments 36 and 37 together for tight frictional engagement with the outer surface of an electrical cable. The arcuate clamping sections 36 and 37 have grooves formed therein and when said clamps are coupled together, a cylindrical through aperture is formed therebetween having a diameter slightly smaller than the diameter of the cable to be clamped therebetween.

To further prevent longitudinal movement of the cable through the bore formed in the end coupler, a bushing 38 is provided at the interface of the packing 24 and the annular flange 23 on the sleeve 22, the bushing being constructed to engage the insulated portion of the electrical cable. The bushing is received within a shallow counter bore formed in the annular flange 23 and has a through aperture formed therein of a diameter equal to the inner diameter of the sleeve 22, these diameters being of such dimension that the inner and outer conductors of the coaxial cable will pass through bushing 38 and sleeve 22 when the outer insulation is removed. The bushing is also provided with a shallow counter bore of a diameter equal to the outer diameter of the cable to define an annular shoulder 39 which is positioned transversely in the aperture of the cable entry device for abutting engagement with the insulated portion of the electrical cable.

In the assembly of the device provided by the present invention, the coaxial armored electrical cable is prepared by exposing the various concentric layers in the usual staggered and step-wise manner, and then the strain relief clamp 35, nut 31, retainer 25, and packing 24 are slid onto the end of the wire. The stripped down end of the cable is then inserted into the body member 11 in such a manner that the armored cable extends through the sleeve 22 and the end of the outer insulating portion of the cable abuts against the annular shoulder 39. The packing 24 is then pushed into the packing housing 14 and the retainer piston 27 is introduced into packing housing 14 with the nut 31 being threaded upon the housing 14 to force the piston portion 27 of the retainer into the housing to simultaneously deform and radially compress the bushing 24 in such a manner that the outer peripheral surface of the bushing sealingly engages the walls of the counter bore 19 while the inner peripheral surface of the packing 24 is forced into sealing engagement with the outer diameter of the cable. The strain relief clamp is then threaded onto the stud 34 and the clamping segment 37 is mounted upon its cooperating segment 36 to frictionally grip and secure the cable therein.

When assembled in this manner, the structural elements cooperate to eliminate all voids within the interior of the body member of the cable entry device, thus effecting a water tight and vapor proof seal. The O-rings 29 provide a tight seal between the piston portion of the retainer and the packing housing 14 to prevent the entry of any water into the interior of the housing 14 and thereby isolates the packing member 24 from the hydrostatic pressure. It has been found that prior art cable entry devices did not prevent the actuation of hydrostatic pressure upon the packing member and therefore, when exposed to extreme hydrostatic pressures in the order of 5,000 p.s.i. or more, the packing member would be compressed against the cable with such force as to damage and often times completely sever the cable thus destroying the electrical continuity of the cable. The present invention limits the magnitude of the mechanical compressive force applied to the packing member 24 by means of the annular flange 33 which cooperates with the end of the packing housing 14 to act as a stop means. The O-rings 29 seal out any water from the interior of the packing housing and thereby prevents the hydrostatic pressure from acting upon the packing member 24, thus enabling the cable entry device of this invention to be used at pressures in excess of 10,000 p.s.i. It has also been found that, at extreme depths, a high longitudinal force is applied to the electrical cable tending to push the cable axially through the coupling device and into the interior of the instrument housing. The annular shoulder 39 formed on the bushing 38 abuts against the insulated portion of the electrical cable to prevent the lateral movement of the cable through the cable entry device at initial pressures, and this resistance is further aided by the frictional engagement of the cable between the two clamping segments 36 and 37 of the strain relief clamp 35. As the instrument descends and the longitudinal force is increased, the cable is pushed longitudinally into the housing 14 but is restricted by the annular shoulder 39, causing the cable to be slightly compressed and to expand radially and engage the inner diameter of the bore formed in the retainer 25, thus effecting a water tight and vapor tight seal between the cable housing and the interior of the retainer 25. The expansion of the cable against the walls of bore 26 formed in the retainer prevents the entry of water or water vapor into the area of the packing member 24 by sealing the space between the cable and the retainer while the O-rings 29 prevent water from leaking between the retainer piston 27 and the packing housing 14, thus eliminating all voids within the cable entry device and isolating the packing grommet from further compression by hydrostatic pressures.

From the foregoing, it may be seen that the present invention provides a cable entry device which produces a water tight and vapor tight seal and is virtually independent of hydrostatic pressure. While the preferred embodiment of my invention has been shown and described, it is to be understood that the changes and modifications may be made without departing from the spirit and scope of the invention.

What is claimed is:

1. A cable entry device for use in sealingly introducing an electrical cable through an opening in a wall having differential pressures on opposite sides thereof, which comprises, a cylindrical body member having an axial bore therethrough and further having a counter bore formed at one end thereof, said cylindrical body having a neck portion at its other end for insertion through said opening in said wall, an annular packing grommet formed of a deformable and substantially incompressible elastic material and having an outer diameter substantially equal to the diameter of said counter bore and having an axial bore formed therein of a diameter substantially equal to the diameter of said cable, said packing grommet being received in the counter bore portion of said body member, a packing retainer having an axial bore therethrough of a diameter substantially equal to the diameter of said cable and further having a piston formed on one end thereof, said piston being slideably received within said counter bore for abutting contact with said packing grommet, sealing means positioned between and engaging the piston and the wall of the counter bore portion of the body member to prevent fluid leakage therebetween, and means for moving said piston longitudinally within said counter bore to simultaneously deform and radially compress the packing grommet into circumferential sealing contact with a coaxial cable received.

2. The device of claim 1 wherein said piston moving means comprises a nut threaded upon said cylindrical body member and having a flange formed thereon for operative engagement with a flange formed upon said retainer.

3. The device of claim 2 further comprising a strain relief clamp coupled to said retainer and having a pair of cooperating clamping members operatively disposed to clamp said cable therebetween.

4. The device of claim 3 wherein said neck portion of said body member has at least one annular groove formed in the outer peripheral surface thereof, and an O-ring positioned within each of said annular grooves for sealing engagements with the walls of said opening.

5. The device of claim 1 wherein said sealing means comprises at least one O-ring positioned within O-ring receiving annular grooves formed in the outer peripheral surface of said piston, said O-rings being compressed when the piston is received within the counter bore and form a sliding seal therebetween.

6. A cable entry device for use in passing an electrical coaxial cable encased in a waterproof insulation of substantially uniform outer diameter through an aperture formed in a wall across which high pressure differentials may exist while preventing fluid leakage through said aperture, comprising a cylindrical body member having an axial bore extending therethrough and having a counter bore formed in one end thereof to define a first annular shoulder at the juncture of said bore and said counter bore, said body member having a cylindrical neck portion formed at its other end for insertion into said aperture in said wall, a tubular sleeve formed of dielectric material and having an annular base flange formed integrally therewith, said sleeve being disposed within the axial bore in the neck portion of the body member with the annular base flange positioned in said counter bore and abutting said first annular shoulder, said sleeve having an inner diameter substantially equal to the diameter of said cable after the outer insulation has been removed, an annular packing grommet formed of a deformable and substantially incompressible elastic material and having an outer diameter substantially equal to the outer diameter of said counter bore and an inner diameter substantially equal to the diameter of said cable, said packing grommet being received within said counter bore, a packing retainer having an axial bore therethrough of a diameter substantially equal to the diameter of said cable and having a piston portion formed on one end thereof, said piston being received within said counter bore for abutting contact with said grommet, and means for moving said piston longitudinally within said counter bore to simultaneously deform and radially compress the packing grommet into circumferential sealing contact with a coaxial cable received therein.

7. The device of claim 6 wherein said piston moving means comprises a nut threaded upon said body member, said nut having a radially inwardly directed flange formed thereon for engagement with a radially outwardly extending flange formed on said retainer.

8. The device of claim 7 further comprising a strain relief clamp coupled to said retainer and having a pair of cooperating clamping members operatively disposed to clamp said cable therebetween.

9. The device of claim 8 wherein said neck portion has at least one annular groove formed in its outer peripheral surface, and an O-ring positioned within each of said annular grooves to provide a slideable sealing contact with the walls of said aperture.

10. The device of claim 9 further comprising an annular metallic bushing received in a counter bore formed in the annular base flange of said sleeve, said bushing having a bore therethrough of a diameter substantially equal to the diameter of the cable after the outer insulation has been removed, said bushing having a counter bore therein of a diameter substantially equal to the diameter of the cable, the bore and counter bore formed in the bushing cooperating to define a second annular shoulder, whereby longitudinal forces tending to force the cable through the aperture are restrained by the strain relief clamp and by abutment of the outer insulation of the cable against said second annular shoulder.

11. The device of claim 6 further comprising means to prevent fluid leakage between the piston and the counter bore wherein said piston has at least one annular groove formed in the outer peripheral surface thereof, and an O-ring positioned within each of said annular grooves to provide a slideable sealing contact with the counter bore.

References Cited by the Examiner

UNITED STATES PATENTS

| 2,333,580 | 11/1943 | Renshaw et al. | 174—65 X |
| 2,955,466 | 10/1960 | Coles | 174—77 X |
| 3,055,972 | 9/1962 | Peterson | 174—151 |

FOREIGN PATENTS

| 1,118,000 | 3/1956 | France. |
| 598,046 | 6/1935 | Germany. |

LARAMIE E. ASKIN, *Primary Examiner.*